(12) United States Patent
Colven

(10) Patent No.: US 7,430,166 B2
(45) Date of Patent: Sep. 30, 2008

(54) PROVISIONING ETHERNET DUAL WORKING MODE

(75) Inventor: David Michael Colven, Dallas, TX (US)

(73) Assignee: Fujitsu Limited, Kawasaki (JP)

( * ) Notice: Subject to any disclaimer, the term of this patent is extended or adjusted under 35 U.S.C. 154(b) by 929 days.

(21) Appl. No.: 10/745,562

(22) Filed: Dec. 29, 2003

(65) Prior Publication Data

US 2005/0141533 A1  Jun. 30, 2005

(51) Int. Cl.
*H04J 1/16* (2006.01)
*H04J 3/14* (2006.01)

(52) U.S. Cl. .................................. 370/222; 370/258

(58) Field of Classification Search .................. 370/466, 370/539, 354, 395.5, 237, 474, 473, 506, 370/406, 241; 709/226, 239
See application file for complete search history.

(56) References Cited

U.S. PATENT DOCUMENTS

| | | | | |
|---|---|---|---|---|
| 5,461,622 | A * | 10/1995 | Bleickardt et al. | 370/470 |
| 6,426,941 | B1 * | 7/2002 | Vaman et al. | 370/228 |
| 6,798,779 | B1 * | 9/2004 | Shimbashi et al. | 370/395.1 |
| 7,116,642 | B2 * | 10/2006 | Tofinetti et al. | 370/254 |
| 7,170,851 | B1 * | 1/2007 | Chen et al. | 370/222 |
| 2003/0187934 | A1 * | 10/2003 | Nishikawa et al. | 709/206 |
| 2004/0001519 | A1 * | 1/2004 | Fisher et al. | 370/535 |
| 2004/0076166 | A1 * | 4/2004 | Patenaude | 370/401 |
| 2004/0076168 | A1 * | 4/2004 | Shimbashi et al. | 370/395.1 |
| 2004/0076175 | A1 * | 4/2004 | Patenaude | 370/465 |
| 2004/0233843 | A1 * | 11/2004 | Barker | 370/225 |
| 2005/0089026 | A1 * | 4/2005 | Klish, II | 370/352 |
| 2008/0101364 | A1 * | 5/2008 | Chow et al. | 370/390 |

* cited by examiner

*Primary Examiner*—Ajit G Patel
(74) *Attorney, Agent, or Firm*—Hanify & King, PC

(57) ABSTRACT

A method and system provides the capability to provision Dual Working mode service in a SONET network, while maintaining compatibility with existing SONET provisioning systems. In one embodiment of the present invention, a method for provisioning dual working mode in a Synchronous Optical Network/Synchronous Digital Hierarchy network comprises the steps of generating provisioning commands to provision a non-dual working mode of operation in the Synchronous Optical Network/Synchronous Digital Hierarchy network, modifying the generated commands to indicate to a first network element that dual working mode is being provisioned, and transmitting the modified commands to provision the Synchronous Optical Network/Synchronous Digital Hierarchy network.

20 Claims, 10 Drawing Sheets

Dual Working o+p = i, o != p

0:2 mode (o = i, p = 0) OR (o = 0, p = i)

UPSR mode o=p = i

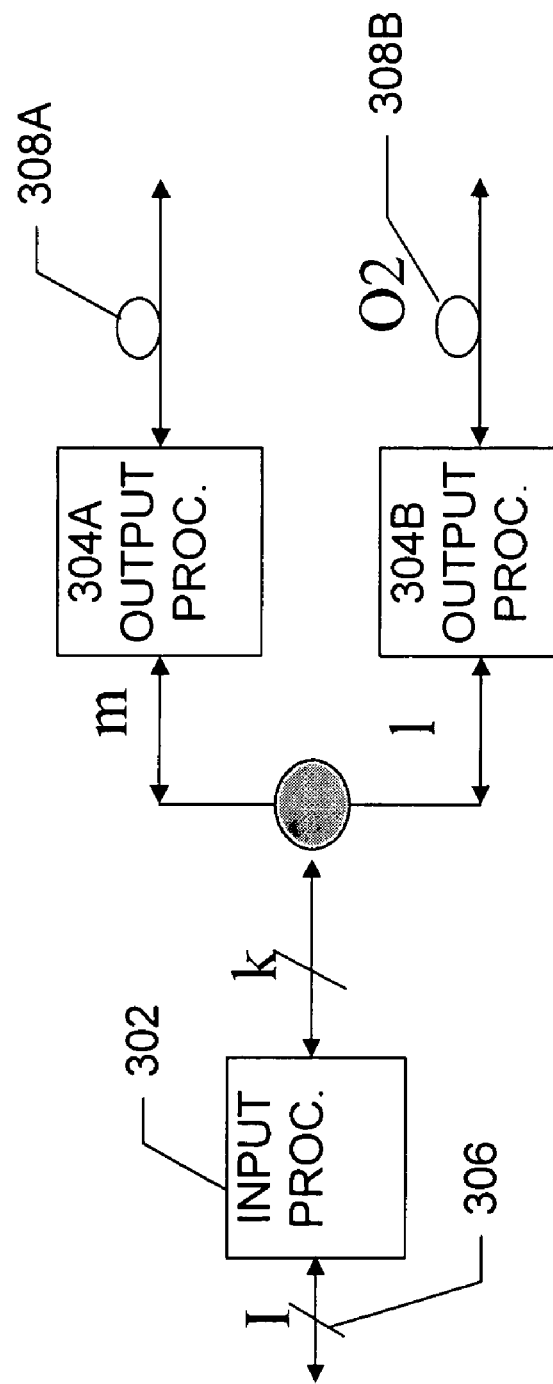

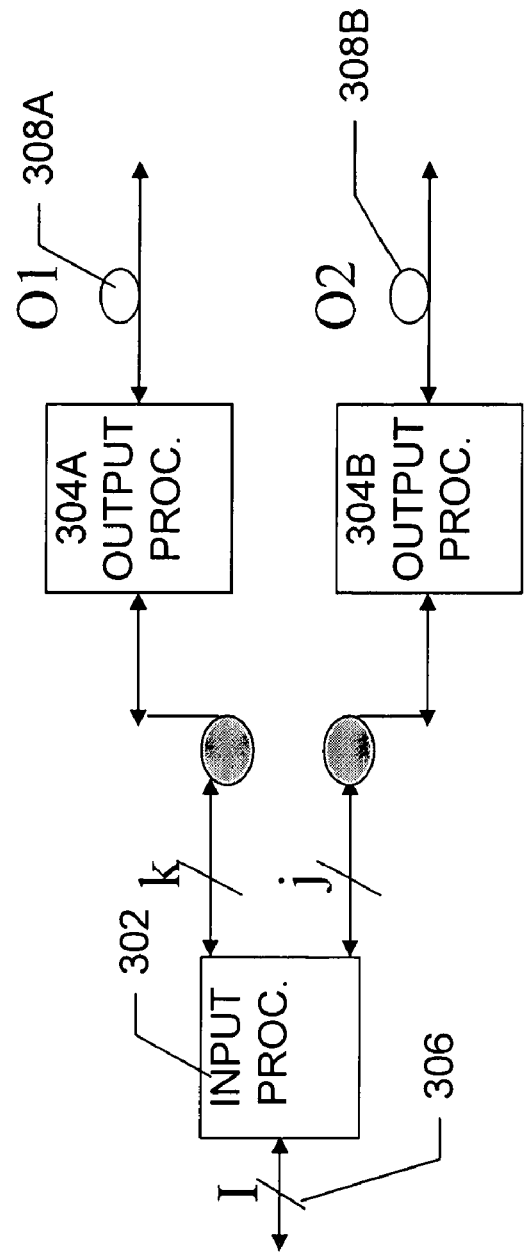

PROVISIONING ETHERNET DUAL WORKING MODE

FIELD OF THE INVENTION

The present invention relates to provisioning dual working mode in a SONET or SDH network.

BACKGROUND OF THE INVENTION

In order to provision Dual Working mode service in a SONET network, it is necessary to establish different information on the working and protecting paths. The normal SONET provisioning models don't support this. A need arises for a technique that provides the capability to provision Dual Working mode service in a SONET network, while maintaining compatibility with existing SONET provisioning systems.

SUMMARY OF THE INVENTION

The present invention provides the capability to provision Dual Working mode service in a SONET network, while maintaining compatibility with existing SONET provisioning systems. The present invention "overloads" the current Unidirectional Path Switched Ring (UPSR) provisioning of the SONET network in order to provide the paths needed for Dual Working. Since it is important to do this under the Operations Systems Modification of Intelligent Network Elements (OSMINE) (Tl1 based management) process this must also be considered.

For Operations Systems Modification of Intelligent Network Elements (OSMINE) the Dual Working mode looks much like Unidirectional Path Switched Ring (UPSR) and can be treated as such at all but the "endpoint" network elements (NEs). These are the network elements (NEs) that host the Ethernet interfaces. Those network elements (NEs) must send different information on the working and protecting paths and also know to receive same in the opposite direction. Changing keywords is the simplest approach under Operations Systems Modification of Intelligent Network Elements (OSMINE). For that reason a new keyword in the EPORT command would be added. This keyword when specified as dual informs the Ethernet interface to send a Virtually Concatenated Ethernet stream split between both line interfaces. In the case that cross connect provisioning is also needed (all 4000 network elements (NEs) except 4020) then the cross connects are provisioned as if they were Unidirectional Path Switched Ring (UPSR). However, the system knows due to the earlier entry of the key word under EPORT that the cross connects are actually Dual Working and knows to bypass the path selector and send both the working and protecting traffic to the Ethernet service.

In one embodiment of the present invention, a method for provisioning dual working mode in a Synchronous Optical Network/Synchronous Digital Hierarchy network comprises the steps of generating provisioning commands to provision a non-dual working mode of operation in the Synchronous Optical Network/Synchronous Digital Hierarchy network, modifying the generated commands to indicate to a first network element that dual working mode is being provisioned, and transmitting the modified commands to provision the Synchronous Optical Network/Synchronous Digital Hierarchy network.

In one aspect of the present invention, dual working mode comprises communicating different data on each of a plurality of Synchronous Optical Network/Synchronous Digital Hierarchy network paths to the first network element. The different data may be generated at a second network element using virtual concatenation. The different data may be generated from a data stream communicated with a local area network coupled to the second network element. The different data may be reassembled at the first network element using virtual concatenation. The reassembled different data may be communicated with a local area network connected to the first network element.

In one aspect of the present invention, the first network element comprises a first local area network service unit and a first plurality of logical units, a second network element comprises a second local area network service unit and a second plurality of logical units, the second local area network service unit communicates with a second local area network and the different data is generated from a data stream communicated with the second local area network, and each of the second plurality of logical units communicates different data with a different one of the first plurality of logical units over a different Synchronous Optical Network/Synchronous Digital Hierarchy network path. The different data may be generated at the second network element using virtual concatenation. The first local area network service unit may communicate with a first local area network. The different data may be reassembled at the first network element using virtual concatenation. The reassembled different data may be communicated with the first local area network.

BRIEF DESCRIPTION OF THE DRAWINGS

The details of the present invention, both as to its structure and operation, can best be understood by referring to the accompanying drawings, in which like reference numbers and designations refer to like elements.

FIG. 3a is an exemplary diagram of processing control for "0:2" and "Unidirectional Path Switched Ring (UPSR)" modes of operation from a perspective internal to a network element.

FIG. 3b is an exemplary diagram of processing control for dual working mode of operation from a perspective internal to a network element.

DETAILED DESCRIPTION OF THE INVENTION

Dual working mode is a mode of operation of a SONET network in which each of the OCn side interfaces is used independently by the data service side interfaces. Dual working mode effectively doubles service unit backplane bandwidth and SONET ring bandwidth. For example, Dual Working mode allows a full Gigabit per second (Gbps) rate on OC12 when used with Virtual Concatenation (VCAT) and allows three times a 100 Megabit per second (Mbps) rate on OC3 when used with Virtual Concatenation (VCAT).

Figure 1:
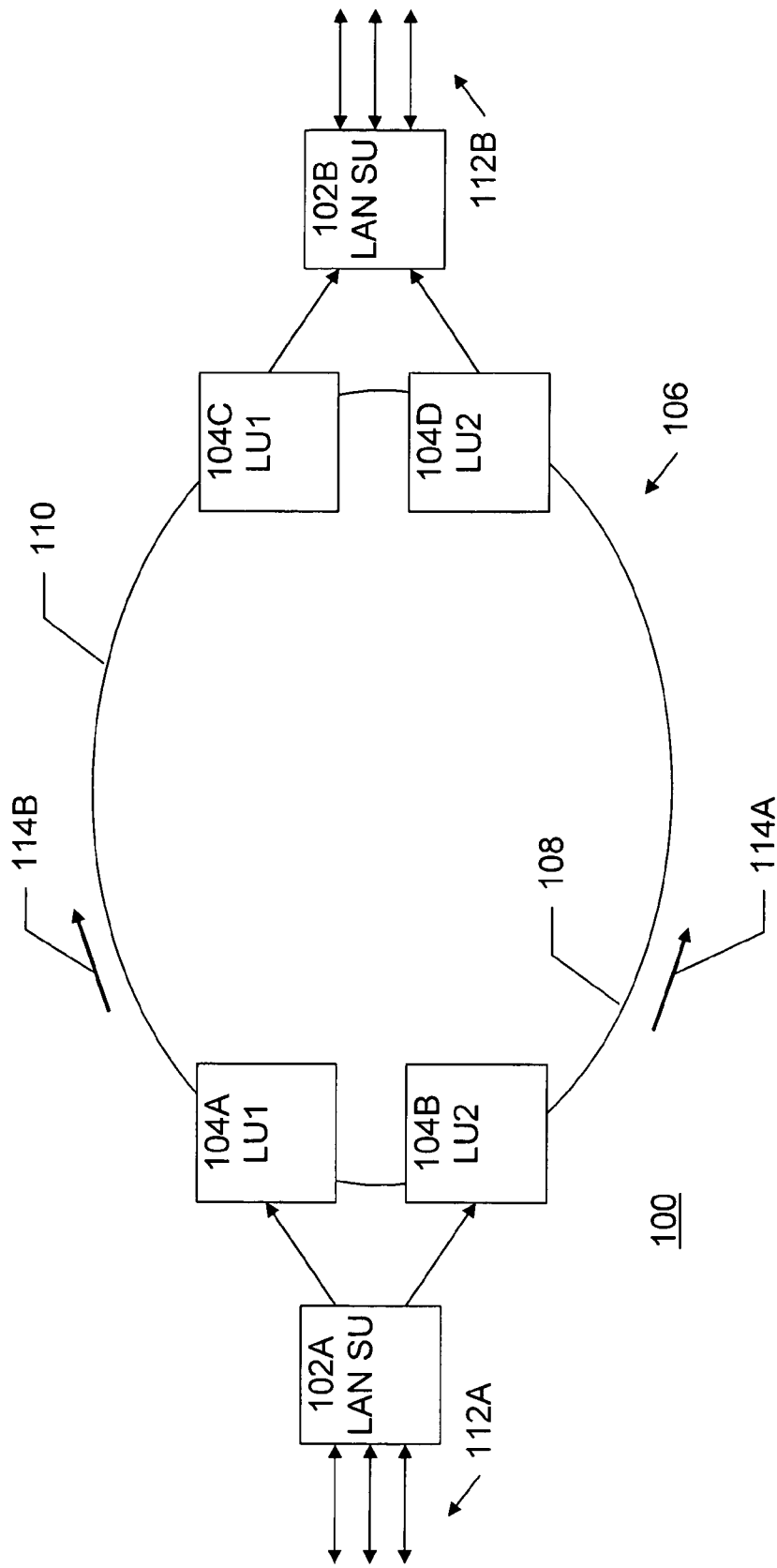
FIG. 1 is an exemplary block diagram of a SONET network 100 operated in Dual Working mode.

An example of a SONET network 100 operated in Dual Working mode is shown in FIG. 1. Exemplary network 100 includes Local Area Network Service Units (LANSUs) 102A-B, Line Units (LUs) 104A-D, and SONET ring 106, which includes Working path 108 and Protecting path 110. LANSUs 102A-B provide the interface between the other networks 112A-B connected to LANSUs 102A-B and the working 108 and protection 110 paths of SONET network 100. For example, LANSUs 102A-B may connect the working 108 and protection 110 paths of SONET network 100 to Local Area Networks such as Ethernet networks, Token Ring networks, etc. Each LANSU is connected to two LUs. For example, LANSU 102A is connected to LU 104A and LU 104B and LANSU 102B is connected to LU 104C and LU 104D. Each line unit provides the interface from the LANSU to the SONET network path, as well as providing timing control to access precision network clock and SONET frame pulse reference.

In Dual Working mode, different data is communicated over each path of SONET ring 106, rather than the conventional SONET operation in which the same data is communicated over both paths. For example, data 114A is communicated over working path 108, while data 114B is communicated over protecting path 110. Data to/from LAN 112A-B is split between working path 108 and protecting path 110 using the well-known Virtual Concatenation (VCAT) standard. Each path may carry data at the full path bandwidth, thus providing twice the network bandwidth of the conventional SONET operation in which the same data is communicated over both paths.

If a fault occurs in one of the paths of SONET network 106 (either a path failure or an electronics failure) when operated in Dual Working mode, the fact is noted at the receiving end, which signals using Link Capacity Adjustment Scheme (LCAS) back to the data source that the Synchronous Transport Signal (STS) (or block of Synchronous Transport Signals (STSs) in case of path failure) is down. Link Capacity Adjustment Scheme (LCAS) drops the "broken" Synchronous Transport Signals (STSs) from the active members of the Virtual Concatenation (VCAT) group. In a typical scenario in which a path fails, half the Synchronous Transport Signals (STSs) are down and the data rate is cut in half.

Figure 2A:
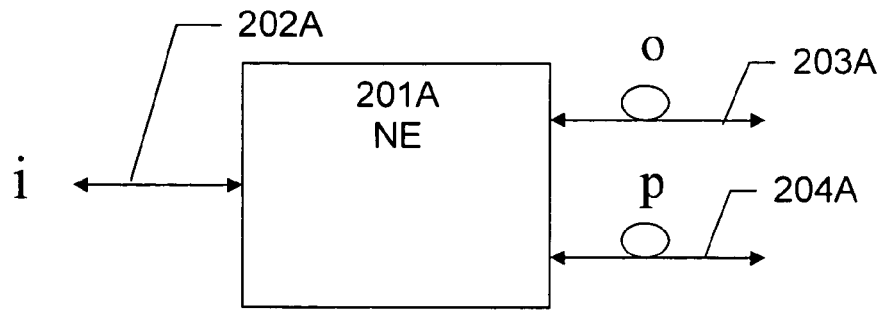
FIG. 2a is an exemplary diagram of dual working mode operation from a perspective external to a network element.
Figure 2B:
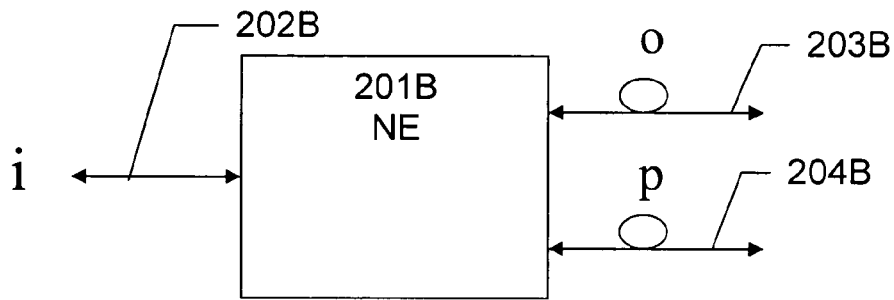
FIG. 2b is an exemplary diagram of "0:2" mode of operation from a perspective external to a network element.
Figure 2C:
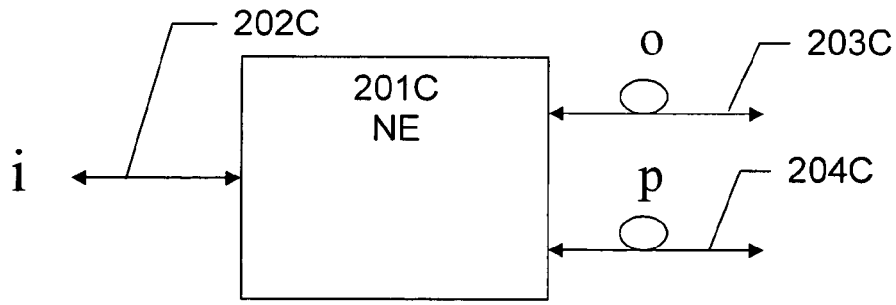
FIG. 2c is an exemplary diagram of "Unidirectional Path Switched Ring (UPSR)" mode of operation from a perspective external to a network element.

A comparison of several modes of operation of a SONET network from a perspective external to a network element is shown in FIGS. 2a-c. Dual working mode operation is shown in FIG. 2a. Network element 201A communicates data i with a LAN 202A. Network element 201A communicates data over a SONET network including working path 203A and protecting path 204A. The data on working path 203 is data o and the data on protecting path 204A is data p. In Dual Working mode, the data o+p=data i, thus the sum of the data communicated on the SONET interfaces 203A and 204A is equal to the information communicated with the LAN 202A.

The conventional "0:2" mode of operation is shown in FIG. 2b. In 0:2 mode, the same data, which is the data communicated by network element 201B with LAN 202B, is fed to both SONET interfaces 203B and 204B, but only appears on one output. For example, the data on working path 203B, o, equals the data on LAN 202B, i (o=i), while there is no data on protecting path 204B (p=0). Dual working mode looks similar to 0:2 mode when a non-Virtual Concatenation (VCAT) data stream is fed to one of the interfaces. Dual working mode looks different from 0:2 when Virtual Concatenation (VCAT) is used to "spread" a single data stream between the two interfaces.

The conventional "Unidirectional Path Switched Ring (UPSR)" mode of operation is shown in FIG. 2c. In Unidirectional Path Switched Ring (UPSR) mode, the data communicated by network element 201C with LAN 202C, is fed to both SONET interfaces 203C and 204C, and appears on both outputs. For example, the data on working path 203C, o, equals the data on LAN 202C, (o=i), and the data on protecting path 204C, p, equals the data on LAN 202C (p=0), thus, o=p=i.

A comparison of several modes of operation of a SONET network from a perspective internal to the network element is shown in FIGS. 3a-b. In FIG. 3a, the processing control for 0:2 and Unidirectional Path Switched Ring (UPSR) modes is shown. These are modes where the input process 302 simply transfers the data to the output processes 304A-B, and the output processes 304A-B determines which information from the input facility 306 is allocated to which output facility 308A-B.

In FIG. 3b, the processing control for Dual Working mode is shown. In Dual Working mode the input process 302 determines which information from the input facility 306 is allocated to which output facility 308A-B, while the output processes 304A-B simply transfer the data.

In order to operate a SONET network in Dual Working mode, the SONET network must be configured, or provisioned, to operate that way. Conventional SONET provisioning models do not support provisioning of a SONET network in Dual Working mode. The present invention "overloads" the standard Unidirectional Path Switched Ring (UPSR) provisioning of the SONET network in order to provide the paths needed for Dual Working mode.

A standard service that is used to provision a SONET network is known as Operations Systems Modification of Intelligent Network Elements (OSMINE). Most domestic telecommunications networks depend on operations support systems (OSS) software developed and maintained by TELCORDIA™. The major local exchange carriers manage their networks using these systems. The Telcordia Operations Systems Modification of Intelligent Network Elements (OSMINE) Services process helps enable network equipment compatibility and interoperability with Telcordia OSSs. This helps to ensure operations systems automation, a requirement to provide Operation, Administration, Maintenance and Provisioning (OAM&P) of services in a timely fashion and on a volume basis. Since it is important to provision Dual Working mode under the Operations Systems Modification of Intelligent Network Elements (OSMINE) process, this must also be considered.

For Operations Systems Modification of Intelligent Network Elements (OSMINE) the Dual Working mode looks much like Unidirectional Path Switched Ring (UPSR) and can be treated as such at all but the "endpoint" network elements (NEs). These are the network elements (NEs) that host the Ethernet interfaces. Those network elements (NEs) must send different information on the working and protecting paths and also know to receive same in the opposite direction. Changing keywords is the simplest approach under Operations Systems Modification of Intelligent Network Elements (OSMINE). For that reason a new keyword in the EPORT command would be added. This MODE keyword when specified as dual informs the Ethernet interface to send a Virtually Concatenated Ethernet stream split between both line interfaces. In the case that cross connect provisioning is also needed (all 4000 network elements (NEs) except 4020) then the cross connects are provisioned as if they were Unidirectional Path Switched Ring (UPSR). However, the system knows due to the earlier entry of the MODE under EPORT that the cross connects are actually Dual Working and knows to bypass the path selector and send both the working and protecting traffic to the Ethernet service.

Figure 4:
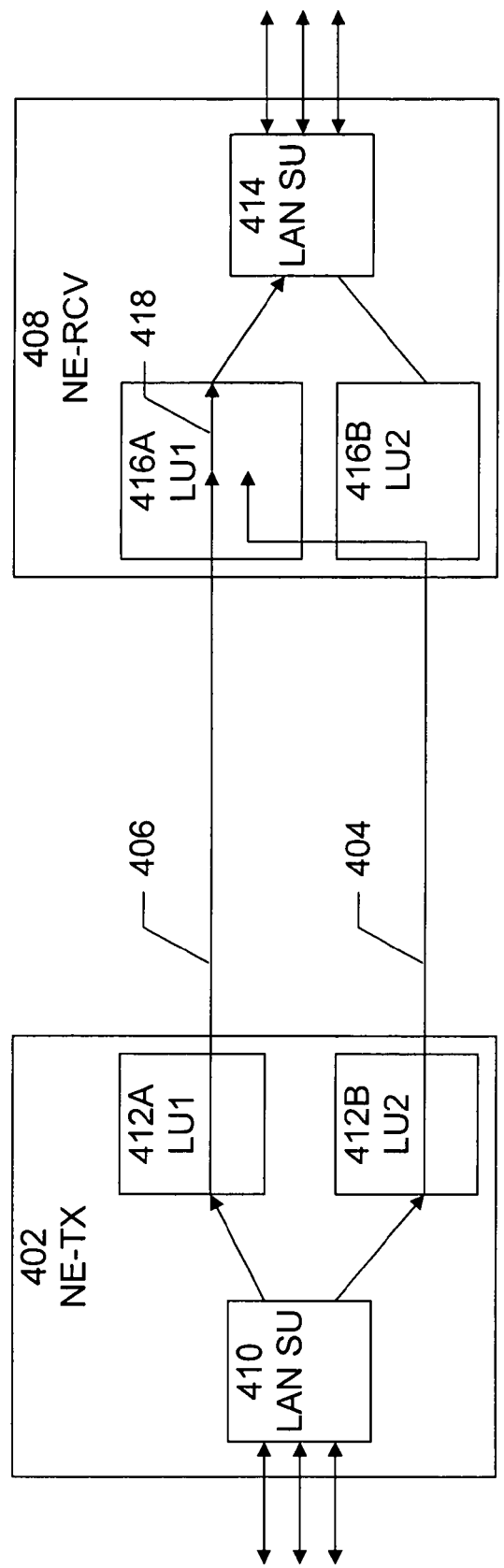
FIG. 4 is an exemplary block diagram of a provisioning scenario for Unidirectional Path Switched Ring (UPSR) mode in a SONET network.

An exemplary provisioning scenario for Unidirectional Path Switched Ring (UPSR) mode in a SONET network is shown in FIG. 4. In the example shown in FIG. 4, the Ethernet unit is present in the same network element as the switch that normally does Unidirectional Path Switched Ring (UPSR). It is assumed that this is the case at both ends of the SONET network, although, for clarity, only one direction of SONET communication is shown. However, one of skill in the art would recognize that the other direction of SONET communication is similar to the example shown. As shown, a transmitting network element (NE-TX) 402 transmits the same data over two separate paths, working path 404 and protecting path 406, to receiving network element (NE-RCV) 408. Each network element, NE-TX 402 and NE-RCV 408, includes a LANSU and two LUs. For example, NE-TX 402 includes LAN SU 410 and LUs 412A-B, and NE-RCV 408 includes LANSU 414 and LUs 416A-B. LANSUs 410 and 414 provide the interface between the other networks connected to LANSUs 410 and 414 and the working 404 and protection 406 paths of the SONET network. Each line unit provides the interface from the LANSU to the SONET network path, as well as providing timing control to access precision network clock and SONET frame pulse reference.

In the Unidirectional Path Switched Ring (UPSR) mode of operation, the same data traffic is transmitted from LANSU 410 to each LU 412A-B. This data traffic is transmitted over both working path 404 and protecting path 406 to LUs 416A-B. At NE-RCV 408, typically within one of the LUs, such as LU 416A, the data traffic from the best path, selected by best path selector 418 between working path 404 and protecting path 406, is sent to LAN SU 414. For example, if LANSU 410 receives Ethernet data at 50 Mbps, then the same Ethernet data is transmitted over working path 404 at 50 Mbps and over protecting path 406 at 50 Mbps. Best path selector 418 selects the data traffic from the best path and LANSU 414 outputs the Ethernet data at 50 Mbps.

An example of provisioning commands that may be used to provision NE-TX 402 and NE-RCV 408 for Unidirectional Path Switched Ring (UPSR) mode is as follows:
   On NE-TX:
   ENT-EPORT:<LAN1-P1>:WANLINK=STS1
   ENT-CRS-STS1:<LAN 1-P1>,<LU1-STS1>
   ENT-CRS-STS1:<LAN1-P1>,<LU2-STS1>
   On NE-RCV:
   ENT-EPORT:<LAN2-P1>:WANLINK=STS1
   ENT-CRS-STS1:<LAN2-P1>,<LU1-STS1>
   ENT-CRS-STS1:<LAN2-P1>,<LU2-STS1>

In order to provision dual working mode, the present invention tricks the Operations Systems Modification of Intelligent Network Elements (OSMINE) service into thinking it is setting up a standard Unidirectional Path Switched Ring (UPSR) so that only a keyword change informs the system that this is not the case. The reason this works is that the middle of the network does not know the difference between dual working and Unidirectional Path Switched Ring (UPSR) virtual ring.

Figure 5:
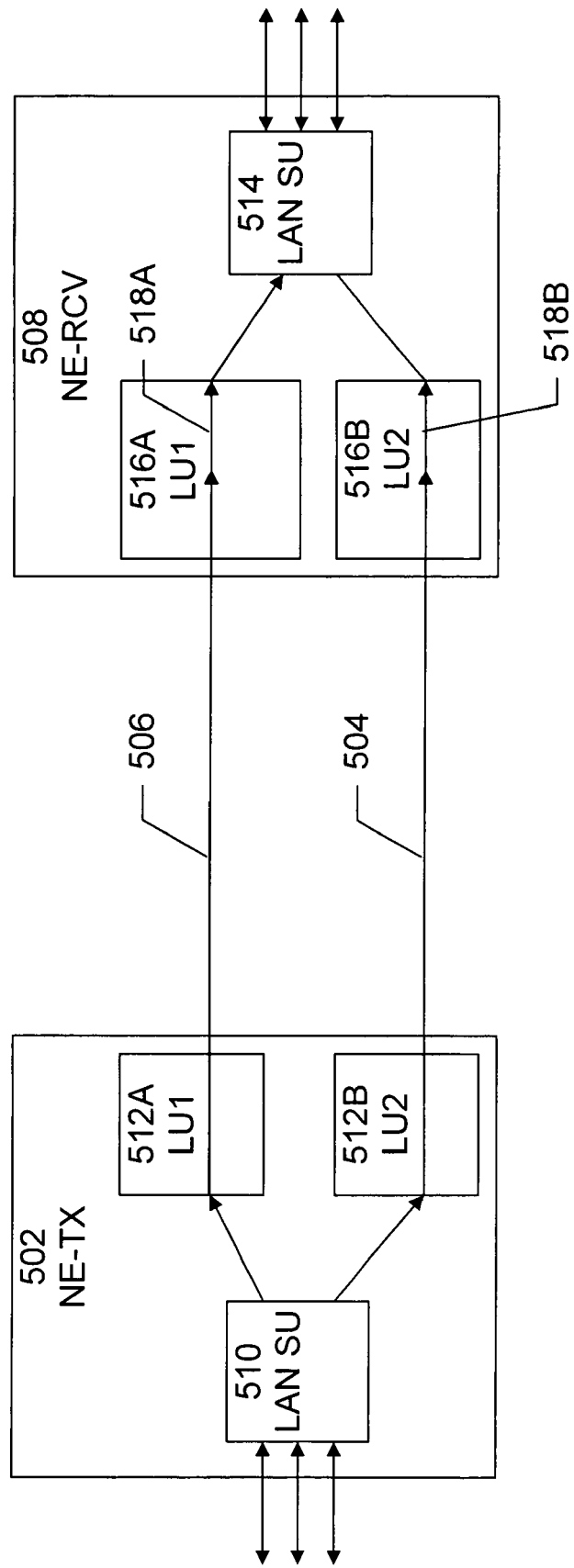
FIG. 5 is an exemplary block diagram of a provisioning scenario for dual working mode in a SONET network.

An example of dual working mode physical connections in a SONET network is shown in FIG. 5. In the example shown in FIG. 5, the Ethernet unit is present in the same network element as the switch that normally does Unidirectional Path Switched Ring (UPSR). It is assumed that this is the case at both ends of the SONET network, although, for clarity, only one direction of SONET communication is shown. However, one of skill in the art would recognize that the other direction of SONET communication is similar to the example shown. As shown, a transmitting network element (NE-TX) 502 transmits different data over two separate paths, working path 504 and protecting path 506, to receiving network element (NE-RCV) 508. Each network element, NE-TX 502 and NE-RCV 508, includes a LANSU and two LUs. For example, NE-TX 502 includes LANSU 510 and LUs 512A-B, and NE-RCV 508 includes LANSU 514 and LUs 516A-B. LANSUs 510 and 514 provide the interface between the other networks connected to LANSUs 510 and 514 and the working 504 and protection 506 paths of the SONET network. Each line unit provides the interface from the LANSU to the SONET network path, as well as providing timing control to access precision network clock and SONET frame pulse reference.

In the dual working mode of operation, the different data traffic is transmitted from LANSU 510 to each LU 512A-B. The data traffic received by LANSU 510 is divided into two data streams of alternating bytes using Virtual Concatenation (VCAT). Each data stream is transmitted over a different path. Thus, one data stream is transmitted over working path 504 and the other data stream is transmitted over protecting path 506 to LUs 516A-B. At NE-RCV 508, the path selectors 518A-B are fixed as selecting the incoming path to each LU. Thus, path selector 518A is fixed as selecting working path 504 and path selector 518B is fixed as selecting protecting path 506. Data from both paths is recombined using Virtual Concatenation (VCAT) and is sent to LAN SU 514. For example, if LANSU 510 receives Ethernet data at 100 Mbps, then a portion of the Ethernet data is transmitted over working path 504 at 50 Mbps and a portion of the Ethernet data is transmitted over protecting path 506 at 50 Mbps. Data from both paths is recombined using Virtual Concatenation (VCAT) and sent to LAN SU 514, which outputs the Ethernet data at 100 Mbps.

An example of provisioning commands that may be used to provision NE-TX 502 and NE-RCV 508 for Dual Working mode is as follows:
   On NE-TX 502
   ED-EQPT:<LAN1>:PATHPROT=DUAL
   ENT-EPORT:<LAN1-P1>:WANLINK=STS1
   ENT-CRS-STS1:<LAN1-P1>,<LU1-STS1>
   ENT-CRS-STS1:<LAN1-P1>,<LU2-STS1>
   On NE-RCV 508
   ED-EQPT:<LAN2>:PATHPROT=DUAL
   ENT-EPORT:<LAN2-P1>:WANLINK=STS1:
   ENT-CRS-STS1:<LAN2-P1>,<LU1-STS1>
   ENT-CRS-STS1:<LAN2-P1>,<LU2-STS1>

It is to be noted that the PATHPROT parameter is set to a new value, "DUAL", rather than the default value of "Unidirectional Path Switched Ring (UPSR)". By adding a new keyword to the ED-EQPT command the present invention uses the same command structure at both end-points. All other nodes and TL1 for end point nodes have exactly the same provisioning as Unidirectional Path Switched Ring (UPSR). Additional keywords should have negligible impact on Operations Systems Modification of Intelligent Network Elements (OSMINE) (this may be a CLIE controlled default so that Operations Systems Modification of Intelligent Network Elements (OSMINE) does not need to set it).

Figure 6:
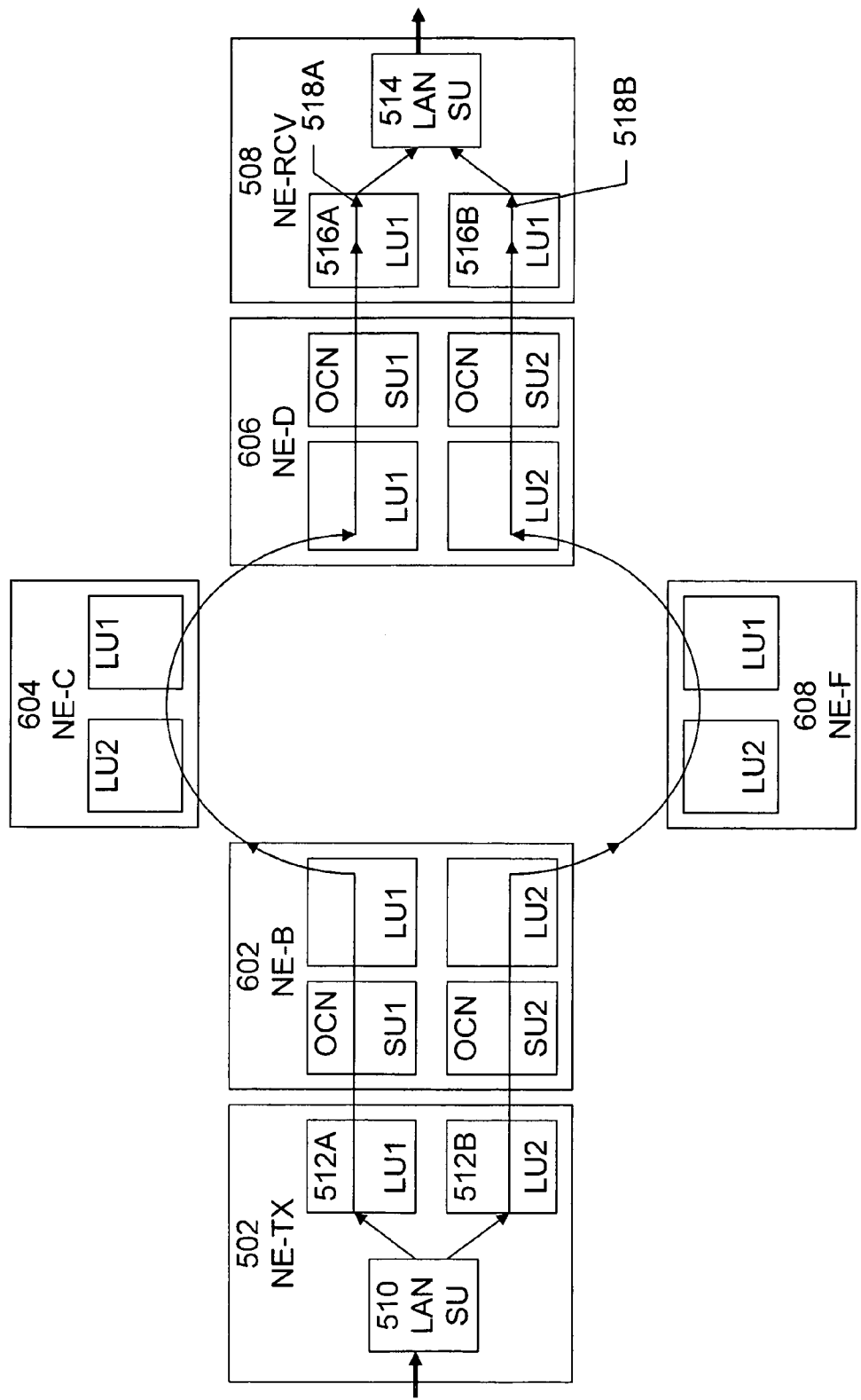
FIG. 6 is an exemplary block diagram of a full SONET ring view of dual working mode connections in a SONET network.

A full SONET ring view example of dual working mode connections in a SONET network is shown in FIG. 6. In the example shown in FIG. 6, NE-TX 502 and NE-RCV 508 are shown along with intermediate network elements 602, 604, 606, and 608.

Dual working mode may also be provisioned as a modification of 0:n service. This 0:n like provisioning may be accomplished, for example, if only a single STS1 is used (Virtual Concatenation (VCAT) is not used) as follows:

On NE-TX 502
ED-EQPT:<LAN1>:PATHPROT=DUAL
ENT-EPORT:<LAN1-P1>:WANLINK=STS1
ENT-CRS-STS1:<LAN1-P1>,<LU1-STS1>
On NE-RCV 508
ED-EQPT:<LAN2>:PATHPROT=DUAL
ENT-EPORT:<LAN2-P1>:WANLINK=STS1
ENT-CRS-STS1:<LAN2-P1>,<LU1-STS1>

The only difference is that only a single cross connect is made. This is the same distinction as between 0:n and Unidirectional Path Switched Ring (UPSR).

A general model of provisioning dual working mode, which is a superset of the Telcordia provisioning model, may be defined using the WANLINK parameter. WANLINK defines the amount of Synchronous Transport Signals (STSs) allocated to each direction of the SONET paths, which, for convenience, may be termed the East and West paths. For example, WANLINK=STS1-2V means that there are allocated at most 2 STS1's on the East path and at most 2 STS1's on the West path. Cross connects may be similar to Unidirectional Path Switched Ring (UPSR) or to a single path. Service is present when the first cross connect is made. If Link Capacity Adjustment Scheme (LCAS) is used there is no "hit" for additional cross connects up to the maximum.

Figure 7:
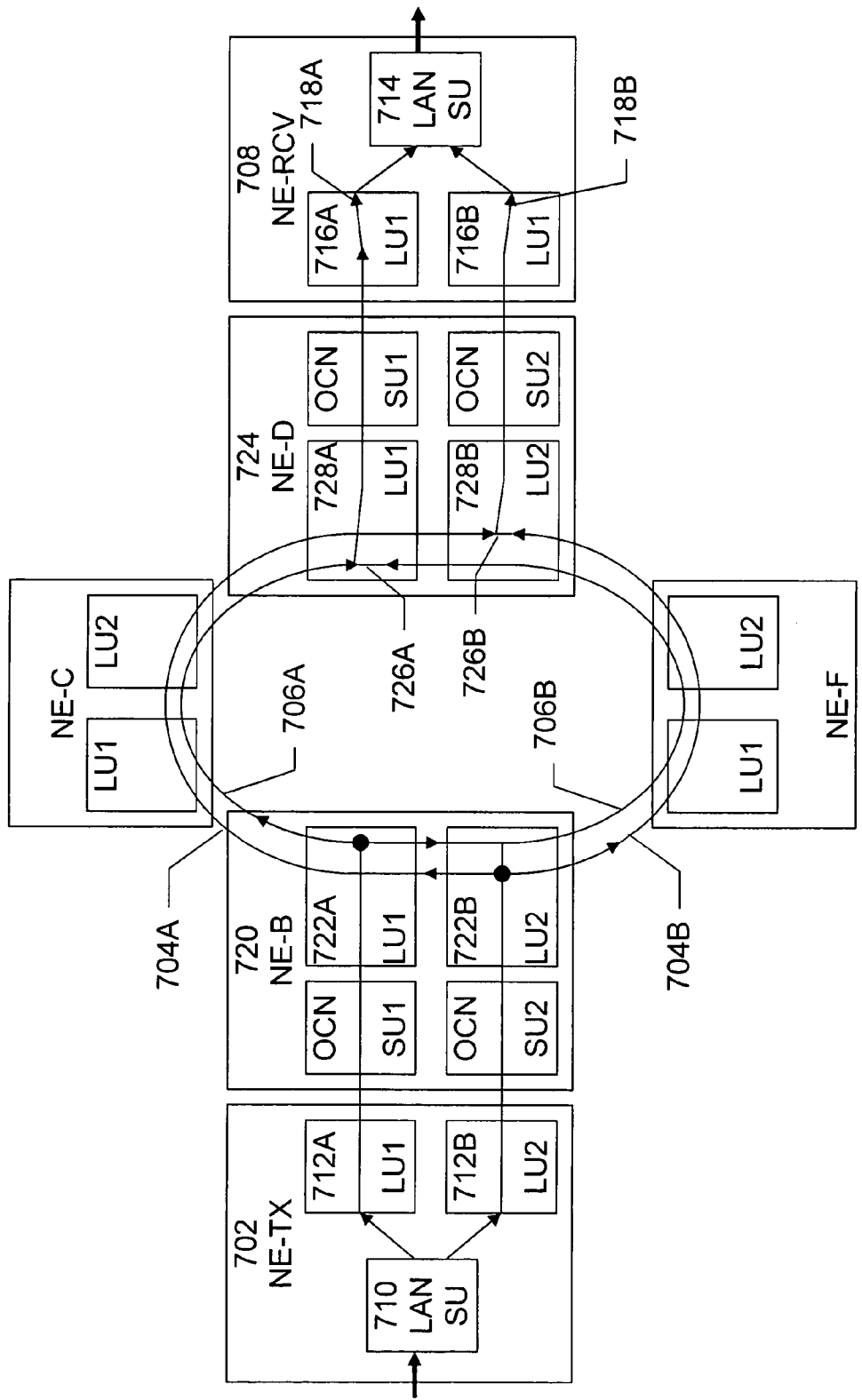
FIG. 7 is an exemplary block diagram of a full SONET ring view of dual working mode connections in a SONET network, which is a non-Telcordia example, in which an internal fully protected ring with peripheral Dual Working Mode (DWM) is running.

An example of dual working mode connections in a SONET network, which is a non-Telcordia example, in which an internal fully protected ring with peripheral Dual Working Mode (DWM) is running, is shown in FIG. 7. In the example shown in FIG. 7, NE-TX 702 transmits different data over both legs of two separate paths, working path legs 704A-B and protecting path legs 706A-B, to NE-RCV 708. NE-TX 702 and NE-RCV 708 each include a LANSU and two LUs. For example, NE-TX 702 includes LANSU 710 and LUs 712A-B, and NE-RCV 708 includes LANSU 714 and LUs 716A-B. LANSUs 710 and 714 provide the interface between the other networks connected to LANSUs 710 and 714 and the working path legs 704A-B and protecting path legs 706A-B of the SONET network. Each line unit provides the interface from the LANSU to the SONET network path, as well as providing timing control to access precision network clock and SONET frame pulse reference.

In the dual working mode of operation, the different data traffic is transmitted from LANSU 710 to each LU 712A-B. The data traffic received by LANSU 710 is divided into two data streams of alternating bytes using Virtual Concatenation. Each data stream is transmitted via additional network elements, such as NE-B 720, over both legs of a different path. Thus, one data stream is transmitted by LU1 722A of NE-B 720 onto both leg 704A and leg 704B of the working path and the other data stream is transmitted by LU2 722B of NE-B 720 onto both leg 706A and leg 706B of the protecting path. Both data streams are transmitted to NE-RCV 708 via intermediate network elements, such as NE-D 724. At NE-D 724, best path selectors 726A-B select the best path from between the two legs of each path. Thus, best path selector 726A, included in LU1 728A of NE-D 724, selects the best path from between leg 706A of the protecting path and leg 706B of the protecting path. Likewise, best path selector 726B, included in LU2 728B of NE-D 724, selects the best path from between leg 704A of the working path and leg 704B of the working path. At NE-RCV 708, the path selectors 718A-B are fixed as selecting the incoming path to each LU. Thus, path selector 718A is fixed as selecting working path 704 and path selector 718B is fixed as selecting protecting path 706. Data from both paths is recombined using Virtual Concatenation (VCAT) and sent to LAN SU 714. For example, if LANSU 710 receives Ethernet-data at 100 Mbps, then a portion of the Ethernet data is transmitted over working path 704 at 70 Mbps and a portion of the Ethernet data is transmitted over protecting path 706 at 70 Mbps. Data from both paths is recombined using Virtual Concatenation (VCAT) and sent to LAN SU 714, which outputs the Ethernet data at 100 Mbps.

Figure 8:
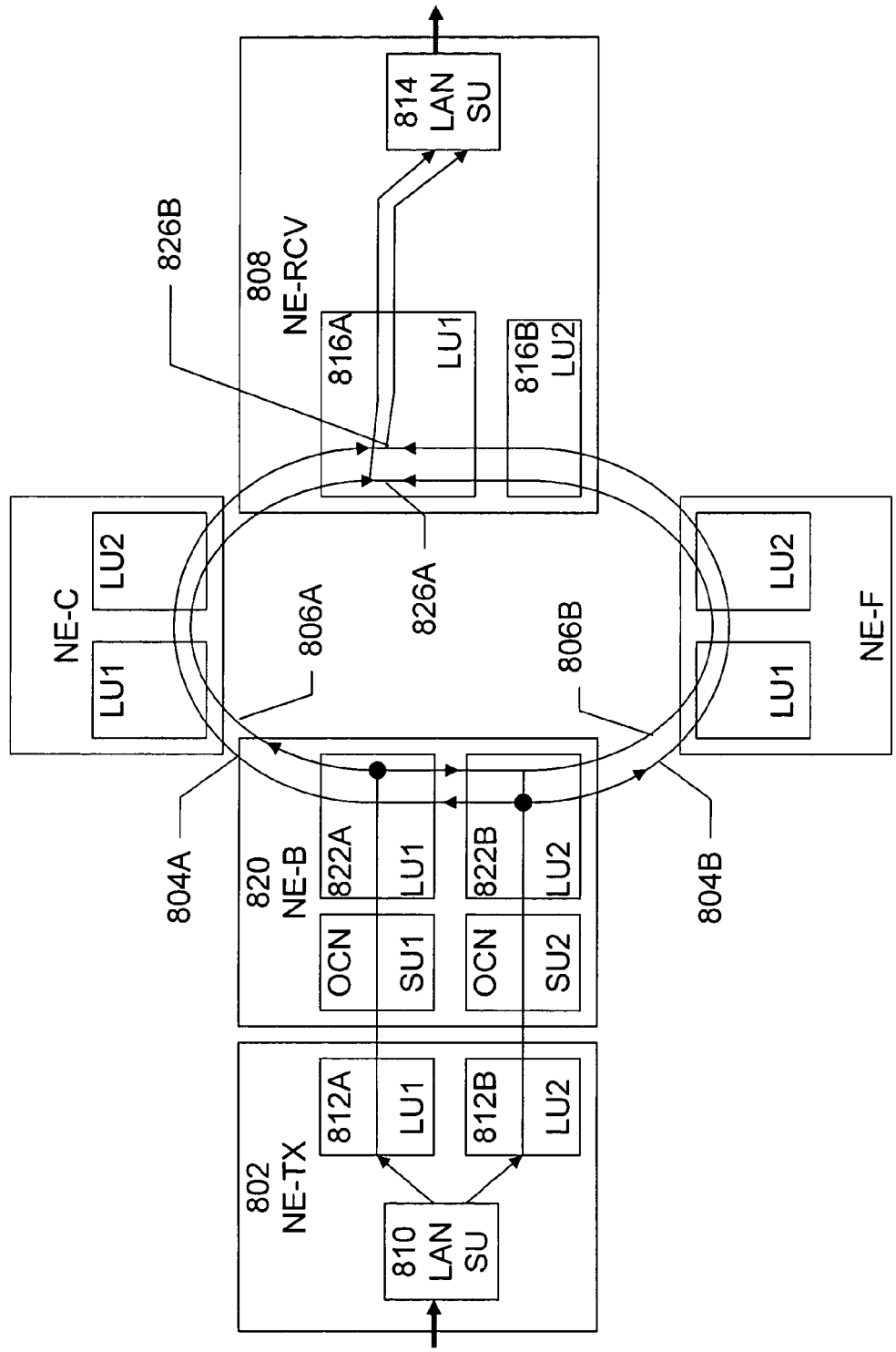
FIG. 8 is an exemplary block diagram of a full SONET ring view of a transmit example of dual working mode connections in a SONET network, which is a non-Telcordia example and which includes an interface between a Dual Working Mode (DWM) network element and a Non-Dual Working Mode (DWM) network element (Transmit).

A transmit example of dual working mode connections in a SONET network, which is a non-Telcordia example and which includes an interface between a Dual Working Mode (DWM) network element and a Non-Dual Working Mode (DWM) network element (Transmit), is shown in FIG. 8. In the example shown in FIG. 8, NE-TX 802 transmits different data over both legs of two separate paths, working path legs 804A-B and protecting path legs 806A-B, to NE-RCV 808. NE-TX 802 and NE-RCV 808 each include a LANSU and two LUs. For example, NE-TX 802 includes LANSU 810 and LUs 812A-B, and NE-RCV 808 includes LANSU 814 and LUs 816A-B. LANSUs 810 and 814 provide the interface between the other networks connected to LANSUs 810 and 814 and the working path legs 804A-B and protecting path legs 806A-B of the SONET network. Each line unit provides the interface from the LANSU to the SONET network path, as well as providing timing control to access precision network clock and SONET frame pulse reference.

In the dual working mode of operation, the different data traffic is transmitted from LANSU 810 to each LU 812A-B. The data traffic received by LANSU 810 is divided into two data streams of alternating bytes using Virtual Concatenation. Each data stream is transmitted via additional network elements, such as NE-B 820, over both legs of a different path. Thus, one data stream is transmitted by LU1 822A of NE-B 820 onto both leg 804A and leg 804B of the working path and the other data stream is transmitted by LU2 822B of NE-B 820 onto both leg 806A and leg 806B of the protecting path. Both data streams are transmitted to NE-RCV 808 via intermediate network elements. At NE-RCV 808, best path selectors 826A-B select the best path from between the two legs of each path. Thus, best path selector 826A, included in LU1 816A of NE-RCV 808, selects the best path from between leg 806A of the protecting path and leg 806B of the protecting path. Likewise, best path selector 826B, also included in LU1 816A of NE-RCV 808, selects the best path from between leg 804A of the working path and leg 804B of the working path. The data streams from both paths are sent to LAN SU 814, where they are recombined using Virtual Concatenation (VCAT).

Figure 9:
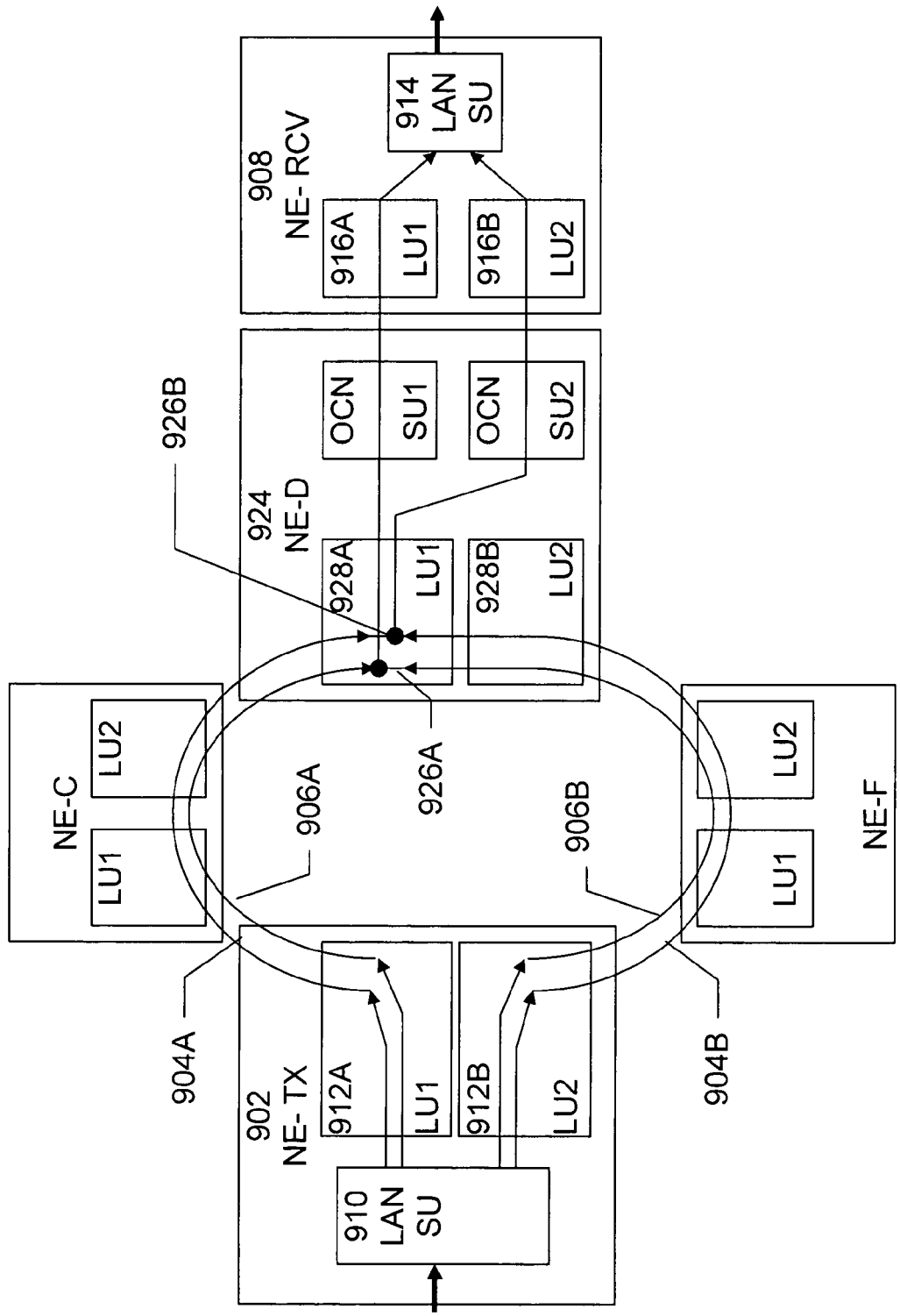
FIG. 9 is an exemplary block diagram of a full SONET ring view of a transmit example of dual working mode connections in a SONET network, which is a non-Telcordia example and which includes an interface between a Dual Working Mode (DWM) network element and a Non-Dual Working Mode (DWM) network element (Receive).

A receive example of dual working mode connections in a SONET network, which is a non-Telcordia example and which includes an interface between a Dual Working Mode (DWM) network element and a Non-Dual Working Mode (DWM) network element (Receive), is shown in FIG. 9. In the example shown in FIG. 9, NE-TX 902 transmits different data over one leg of each path to NE-RCV 908. Thus, NE-TX 902 transmits one data stream over working path leg 904A and protecting path leg 906A and a different data stream over working path leg 904B and protecting path leg 906B. NE-TX 902 and NE-RCV 908 each include a LANSU and two LUs. For example, NE-TX 902 includes LANSU 910 and LUs 912A-B, and NE-RCV 908 includes LANSU 914 and LUs 916A-B. LANSUs 910 and 914 provide the interface between the other networks connected to LANSUs 910 and 914 and the working path legs 904A-B and protecting path legs 906A-B of the SONET network. Each line unit provides the interface from the LANSU to the SONET network path, as well as providing timing control to access precision network clock and SONET frame pulse reference.

In the dual working mode of operation, the different data traffic is transmitted from LANSU 910 to each LU 912A-B. The data traffic received by LANSU 910 is divided into two data streams of alternating bytes using Virtual Concatenation. Each data stream is transmitted via additional network elements, such as NE-TX 902, over one leg of both paths. Thus, one data stream is transmitted by LU1 912A of NE-TX 902 onto both leg 904A of the working path and leg 906A of the protecting path and the other data stream is transmitted by LU2 912B of NE-TX 902 onto both leg 904A of the working path and leg 906B of the protecting path. Both data streams are transmitted to NE-RCV 908 via intermediate network elements. At NE-RCV 908, the path selectors 926A-B are fixed as selecting the incoming paths. The data streams from both paths are sent to LAN SU 914, where they are recombined using Virtual Concatenation (VCAT).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for provisioning dual working mode in a Synchronous Optical Network/Synchronous Digital Hierarchy network comprising the steps of:
generating provisioning commands to provision a non-dual working mode of operation in the Synchronous Optical Network/Synchronous Digital Hierarchy network;
modifying the generated commands to indicate to a first network element that dual working mode is being provisioned; and
transmitting the modified commands to provision the Synchronous Optical Network/Synchronous Digital Hierarchy network;
wherein dual working mode comprises communicating different data on each of a plurality of Synchronous Optical Network/Synchronous Digital Hierarchy network paths to the first network element.

2. The method of claim 1, wherein the different data is generated at a second network element using virtual concatenation.

3. The method of claim 2, wherein the different data is generated from a data stream communicated with a local area network coupled to the second network element.

4. The method of claim 3, wherein the different data is reassembled at the first network element using virtual concatenation.

5. The method of claim 4, wherein the reassembled different data is communicated with a local area network connected to the first network element.

6. The method of claim 1, wherein:
the first network element comprises a first local area network service unit and a first plurality of logical units;
a second network element comprises a second local area network service unit and a second plurality of logical units;
the second local area network service unit communicates with a second local area network and the different data is generated from a data stream communicated with the second local area network; and
each of the second plurality of logical units communicates different data with a different one of the first plurality of logical units over a different Synchronous Optical Network/Synchronous Digital Hierarchy network path.

7. The method of claim 6, wherein the different data is generated at the second network element using virtual concatenation.

8. The method of claim 7, wherein the first local area network service unit communicates with a first local area network.

9. The method of claim 8, wherein the different data is reassembled at the first network element using virtual concatenation.

10. The method of claim 9, wherein the reassembled different data is communicated with the first local area network.

11. A system for provisioning dual working mode in a Synchronous Optical Network/Synchronous Digital Hierarchy network comprising:
means for generating provisioning commands to provision a non-dual working mode of operation in the Synchronous Optical Network/Synchronous Digital Hierarchy network;
means for modifying the generated commands to indicate to a first network element that dual working mode is being provisioned; and
means for transmitting the modified commands to provision the Synchronous Optical Network/Synchronous Digital Hierarchy network;
wherein dual working mode comprises communicating different data on each of a plurality of Synchronous Optical Network/Synchronous Digital Hierarchy network paths to the first network element.

12. The system of claim 11, wherein the different data is generated at a second network element using virtual concatenation.

13. The system of claim 12, wherein the different data is generated from a data stream communicated with a local area network coupled to the second network element.

14. The system of claim 13, wherein the different data is reassembled at the first network element using virtual concatenation.

15. The system of claim 14, wherein the reassembled different data is communicated with a local area network connected to the first network element.

16. The system of claim 11, wherein:
the first network element comprises a first local area network service-unit and a first plurality of logical units;
a second network element comprises a second local area network service unit and a second plurality of logical units;
the second local area network service unit communicates with a second local area network and the different data is generated from a data stream communicated with the second local area network; and
each of the second plurality of logical units communicates different data with a different one of the first plurality of logical units over a different Synchronous Optical Network/Synchronous Digital Hierarchy network path.

17. The system of claim 16, wherein the different data is generated at the second network element using virtual concatenation.

18. The system of claim 17, wherein the first local area network service unit communicates with a first local area network.

19. The system of claim 18, wherein the different data is reassembled at the first network element using virtual concatenation.

20. The system of claim 19, wherein the reassembled different data is communicated with the first local area network.

* * * * *